US011708459B2

(12) United States Patent
Twiddy (10) Patent No.: US 11,708,459 B2
(45) Date of Patent: Jul. 25, 2023

(54) VINYL SULFONYL AGENTS FOR THIOL-ENE POLYMERIZATION AND RELATED USES

(71) Applicant: Inkbit, LLC, Medford, MA (US)

(72) Inventor: Scott Twiddy, Somerville, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/539,517

(22) Filed: Dec. 1, 2021

(65) Prior Publication Data

US 2023/0132021 A1  Apr. 27, 2023

Related U.S. Application Data (60) Provisional application No. 63/270,122, filed on Oct. 21, 2021.

(51) Int. Cl.
*C08G 75/30* (2006.01)
*C08K 13/02* (2006.01)

(52) U.S. Cl.
CPC .............. *C08G 75/30* (2013.01); *C08K 13/02* (2013.01)

(58) Field of Classification Search
CPC ........ C08G 75/30; C08G 13/02; C08G 64/00; C08G 63/00
USPC ........ 264/113, 148, 308, 548; 428/172, 339, 428/375, 450, 451, 548; 528/28, 246
See application file for complete search history.

(56) References Cited

U.S. PATENT DOCUMENTS

| | | | |
|---|---|---|---|
| 3,846,136 A * | 11/1974 | Name not available | G03C 1/49845 430/617 |
| 6,313,065 B1 | 11/2001 | Horsten et al. | |
| 7,183,335 B2 | 2/2007 | Napadensky | |
| 7,479,510 B2 | 1/2009 | Napadensky et al. | |
| 7,851,122 B2 | 12/2010 | Napadensky | |
| 8,106,107 B2 | 1/2012 | Napadensky | |
| 8,481,241 B2 | 7/2013 | Napadensky et al. | |
| 8,871,896 B2 * | 10/2014 | Anderson | C08G 75/12 528/391 |
| 8,883,392 B2 | 11/2014 | Napadensky et al. | |
| 9,056,949 B2 | 6/2015 | Cai et al. | |
| 9,328,275 B2 | 5/2016 | Anderson et al. | |
| 9,334,402 B2 | 5/2016 | Napadensky | |
| 9,340,636 B2 | 5/2016 | Bowman et al. | |
| 9,499,668 B2 | 11/2016 | Cai et al. | |
| 9,523,934 B2 | 12/2016 | Orrock et al. | |
| 9,527,242 B2 | 12/2016 | Rodgers et al. | |
| 9,527,247 B2 | 12/2016 | Dikovsky et al. | |
| 9,546,270 B2 | 1/2017 | Hirsch et al. | |
| 9,557,661 B2 | 1/2017 | Martin | |
| 9,700,492 B2 | 7/2017 | Bowman et al. | |
| 9,708,442 B1 | 7/2017 | Kwisnek et al. | |
| 9,744,722 B2 | 8/2017 | Rodgers | |
| 9,785,064 B2 | 10/2017 | Orrock et al. | |
| 9,864,274 B2 | 1/2018 | Rundlett et al. | |
| 10,023,739 B2 | 7/2018 | Rodgers et al. | |
| 10,059,053 B2 | 8/2018 | Jaker et al. | |
| 10,113,064 B2 | 10/2018 | Hirsch et al. | |
| 10,144,828 B2 | 12/2018 | Rodgers et al. | |
| 10,189,210 B2 | 1/2019 | Rodgers et al. | |
| 10,221,284 B2 | 3/2019 | Eckel | |
| 10,252,466 B2 | 4/2019 | Ramos et al. | |
| 10,400,057 B2 | 9/2019 | Kwisnek et al. | |
| 10,456,984 B2 | 10/2019 | Matusik et al. | |
| 10,457,833 B2 | 10/2019 | Granlund et al. | |
| 10,589,511 B2 | 3/2020 | Vidavsky et al. | |
| 10,675,853 B2 | 6/2020 | Pawloski et al. | |
| 2018/0056582 A1 | 3/2018 | Matusik et al. | |

FOREIGN PATENT DOCUMENTS

| | | |
|---|---|---|
| CN | 105829402 A1 * | 8/2016 |
| JP | 2000158820 A | 6/2000 |
| WO | WO 2020/093030 A1 | 5/2020 |
| WO | WO 2020/123479 A1 | 6/2020 |
| WO | WO 2021/086392 A1 | 5/2021 |

OTHER PUBLICATIONS

KonstanzeSeidler et al., Angewandte, Journal of the German Chemical Society, Vinyl Sulfonate Esters: Efficient Chain Transfer Agents for the 3D Printing of Tough Photopolymers without Retardationr,vol. 57, Issue Jul. 29, 16, 2018 pp. 9165-9169 (Year : 2018).*
Jun Xiong, et al. Vision-sensing and bead width control of a single-bead multi-layer part: material and energy savings in GMAW-based rapid manufacturing; Journal of Cleaner Production 41 (2013) 82-88 (Year: 2013).*
Andrew Riscoe, Using Ionizing Radiation for Catalysis, Mar. 16, 2019, Stanford University. (Year: 2019).*
CN 105829402 A1; Rao, C B; An Adhesion Promoting Adduct Containing Metal Ligand, Its Composition And Its Application (Year: 2016).*
Ligon, S.C. et al. (2017) "Polymers for 3D printing and customized additive manufacturing" Chemical Reviews, 117(15):10212-10290.
Nair, D.P. et al. (2014) "The Thiol-Michael Addition Click Reaction: A Powerful and Widely Used Tool in Materials Chemistry" Chem Mater, 26:724-744.
Sinha, J. et al. (2018) "Multifunctional monomers based on vinyl sulfonates and vinyl sulfonamides for crosslinking thiol-Michael polymerizations: monomer reactivity and mechanical behavior" Chem Commun, 54:3034-3037.
Sinha, J. et al. (Feb. 2020) "Vinyl sulfonamide based thermosetting composites via thiol-Michael polymerization" Dental Materials, 36(2):249-256.
Sitthi-Amorn, P. et al. (2015) "MultiFab: a machine vision assisted platform for multi-material 3D printing" ACM Transactions on Graphics (TOG), 34(4):Article 129; 11 pages.
International Search Report and Written Opinion for International Application No. PCT/US2022/078455 dated Dec. 22, 2022, 16 pages.

(Continued)

*Primary Examiner* — Terressa Boykin
(74) *Attorney, Agent, or Firm* — Cooley LLP (57) ABSTRACT

The present disclosure relates to combinations, build materials, and kits containing vinyl sulfonyl agents for thiol-ene polymerization. The present disclosure also relates to uses of the combinations, materials, and kits, e.g., in 3D printing.

28 Claims, 2 Drawing Sheets

(56) References Cited

OTHER PUBLICATIONS

Lambert, A. et al., "Advances in Oprtical Sensing and Bioanalysis Enabled by 3D Printing," ACS Sensors, 3, pp. 2475-2491, doi: 10.1021/lacssensors.8b1085 (2018).

Cruz, C. M. et al., "Vinyl Sulfonates: A Click Function forCoupling-and-Decoupling Chemistry and their Applications," Adv. Synth. Catal., 358, pp. 3394-3413, DOI: 10.1002/adsc.201600628 (Sep. 2016).

* cited by examiner

VINYL SULFONYL AGENTS FOR THIOL-ENE POLYMERIZATION AND RELATED USES

RELATED APPLICATIONS

This application claims priority to, and the benefit of, U.S. Provisional Application No. 63/270,122, filed on Oct. 21, 2021, the entire contents of which are hereby incorporated in their entirety.

BACKGROUND

Additive manufacturing, also known to as 3D printing, refers to a relatively wide class of techniques for producing parts according to a computer-controlled process, generally to match a desired 3D specification, for example, a solid model. A number of different classes of materials have been used for such 3D printing, with different materials providing corresponding advantages and/disadvantages for different fabrication techniques. For example, a survey of materials may be found in Ligon et al. (*Chemical Reviews* 117(15): 10212-10290 (2017)).

A class of fabrication techniques jets material for deposition on a partially fabricated object using inkjet printing technologies. The jetted material is typically UV cured shortly after it deposited, forming thin layers of cured material. To achieve precision fabrication, some techniques use mechanical approaches to maintain accurate layer-to-layer structure, for example, using mechanical rollers or "planarizers" to control the surface geometry, and therefore control the accuracy of the fabricated object. Therefore, rapid curing is a key feature to allow the planarization and obtain an accurately fabricated object. However, the resulting material properties obtained with such inks may be insufficient.

There is a need for novel materials which may be used as inks in 3D printing. The present disclosure addresses this need.

SUMMARY

In some aspects, the present disclosure provides a method for printing an object (e.g., 3D printing) using a combination, build material, or kit disclosed herein.

In some aspects, the present disclosure provides a method for printing an object (e.g., 3D printing), comprising:
  (a) depositing (e.g., jetting) a combination comprising (i) a vinyl sulfonyl agent and (ii) a thiol agent; and
  (ii) subjecting the deposited combination to a build curing condition.

In some aspects, the present disclosure provides a method for printing an object (e.g., 3D printing), comprising:
  (a) depositing (e.g., jetting) a combination comprising (i) a vinyl sulfonyl agent, (ii) a thiol agent, and (iii) a curing catalyst; and
  (b) subjecting the deposited combination to a build curing condition.

In some aspects, the present disclosure provides a method for printing an object (e.g., 3D printing), comprising:
  (a) depositing (e.g., jetting) a building material comprising (i) a vinyl sulfonyl agent and (ii) a thiol agent; and
  (b) subjecting the deposited building material to a build curing condition.

In some aspects, the present disclosure provides a method for printing an object (e.g., 3D printing), comprising:
  (a) depositing (e.g., jetting) a building material comprising (i) a vinyl sulfonyl agent, (ii) a thiol agent, and (iii) a curing catalyst; and
  (b) subjecting the deposited building material to a build curing condition.

In some aspects, the present disclosure provides a method for printing an object (e.g., 3D printing), comprising:
  (a) depositing (e.g., jetting) a support material;
  (b) depositing (e.g., jetting) a building material comprising (i) a vinyl sulfonyl agent and (ii) a thiol agent; and
  (c) subjecting the deposited building material to a build curing condition.

In some aspects, the present disclosure provides a method for printing an object (e.g., 3D printing), comprising:
  (a) depositing (e.g., jetting) a support material;
  (b) depositing (e.g., jetting) a building material comprising (i) a vinyl sulfonyl agent, (ii) a thiol agent, and (iii) a curing catalyst; and
  (c) subjecting the deposited building material to a build curing condition.

In some aspects, the present disclosure provides a combination, build material, or kit disclosed herein for printing an object (e.g., 3D printing).

In some aspects, the present disclosure provides a combination for printing an object (e.g., 3D printing), wherein the combination comprises:
  (i) a vinyl sulfonyl agent; and
  (ii) a thiol agent.

In some aspects, the present disclosure provides a combination for printing an object (e.g., 3D printing), wherein the combination comprises:
  (i) a vinyl sulfonyl agent;
  (ii) a thiol agent; and
  (iii) a curing catalyst.

In some aspects, the present disclosure provides a building material for printing an object (e.g., 3D printing), wherein the building material comprises:
  (i) a vinyl sulfonyl agent; and
  (ii) a thiol agent.

In some aspects, the present disclosure provides a building material for printing an object (e.g., 3D printing), wherein the building material comprises:
  (i) a vinyl sulfonyl agent;
  (ii) a thiol agent; and
  (iii) a curing catalyst.

In some aspects, the present disclosure provides a kit for printing an object (e.g., 3D printing), wherein the kit comprises:
  a build material comprising:
    (i) a vinyl sulfonyl agent; and
    (ii) a thiol agent; and
  a support material.

In some aspects, the present disclosure provides a kit for printing an object (e.g., 3D printing), wherein the kit comprises:
  a build material comprising:
    (i) a vinyl sulfonyl agent;
    (ii) a thiol agent; and
    (iii) a curing catalyst; and
  a support material.

In some aspects, the present disclosure provides a cured build material described herein.

In some aspects, the present disclosure provides a cured build material being prepared by a method described herein.

In some aspects, the present disclosure provides a system for printing an object (e.g., 3D printing), comprising:

(i) a printer (e.g., an inkjet printer); and (ii) a combination, build material, or kit disclosed herein.

Unless otherwise defined, all technical and scientific terms used herein have the same meaning as commonly understood by one of ordinary skill in the art to which this disclosure belongs. In the specification, the singular forms also include the plural unless the context clearly dictates otherwise. Although methods and materials similar or equivalent to those described herein can be used in the practice or testing of the present disclosure, suitable methods and materials are described below. All publications, patent applications, patents and other references mentioned herein are incorporated by reference. The references cited herein are not admitted to be prior art to the claimed invention. In the case of conflict, the present specification, including definitions, will control. In addition, the materials, methods and examples are illustrative only and are not intended to be limiting. In the case of conflict between the chemical structures and names of the compounds disclosed herein, the chemical structures will control.

Other features and advantages of the disclosure will be apparent from the following detailed description and claims.

DETAILED DESCRIPTION

Without wishing to be bound by theory, the present disclosure relates to discovery of combination, build material, or kit that may be suitable for 3D printing. In some embodiments, the combination, material, or kit may allow for a 3D printing process that does not require any contact to control the surface geometry of the object being printed, e.g., a 3D printing process using a non-contact (e.g., optical) feedback approach. In some embodiments, the combination, material, or kit may allow for a 3D printing process involving thiol-ene polymerization. In some embodiments, the combination, material, or kit may allow for a higher degree of thiol-ene polymerization as compared to a combination, material, or kit containing a different alkenyl monomer. In some embodiments, the combination, material, or kit may allow thiol-ene polymerization in the absence of radiation.

Methods of Printing Objects

In some aspects, the present disclosure provides a method for printing an object (e.g., 3D printing) using a combination, build material, or kit disclosed herein.

In some aspects, the present disclosure provides a method for printing an object (e.g., 3D printing), comprising:
(a) depositing (e.g., jetting) a combination comprising (i) a vinyl sulfonyl agent and (ii) a thiol agent; and
(ii) subjecting the deposited combination to a build curing condition.

In some aspects, the present disclosure provides a method for printing an object (e.g., 3D printing), comprising:
(a) depositing (e.g., jetting) a combination comprising (i) a vinyl sulfonyl agent, (ii) a thiol agent, and (iii) a curing catalyst; and
(b) subjecting the deposited combination to a build curing condition.

In some aspects, the present disclosure provides a method for printing an object (e.g., 3D printing), comprising:
(a) depositing (e.g., jetting) a building material comprising (i) a vinyl sulfonyl agent and (ii) a thiol agent; and
(b) subjecting the deposited building material to a build curing condition.

In some aspects, the present disclosure provides a method for printing an object (e.g., 3D printing), comprising:
(a) depositing (e.g., jetting) a building material comprising (i) a vinyl sulfonyl agent, (ii) a thiol agent, and (iii) a curing catalyst; and
(b) subjecting the deposited building material to a build curing condition.

In some aspects, the present disclosure provides a method for printing an object (e.g., 3D printing), comprising:
(a) depositing (e.g., jetting) a support material;
(b) depositing (e.g., jetting) a building material comprising (i) a vinyl sulfonyl agent and (ii) a thiol agent; and
(c) subjecting the deposited building material to a build curing condition.

In some aspects, the present disclosure provides a method for printing an object (e.g., 3D printing), comprising:
(a) depositing (e.g., jetting) a support material;
(b) depositing (e.g., jetting) a building material comprising (i) a vinyl sulfonyl agent, (ii) a thiol agent, and (iii) a curing catalyst; and
(c) subjecting the deposited building material to a build curing condition.

In some aspects, the present disclosure provides a combination, build material, or kit disclosed herein for printing an object (e.g., 3D printing).

In some aspects, the present disclosure provides a combination for printing an object (e.g., 3D printing), wherein the combination comprises:
(i) a vinyl sulfonyl agent; and
(ii) a thiol agent.

In some aspects, the present disclosure provides a combination for printing an object (e.g., 3D printing), wherein the combination comprises:
(i) a vinyl sulfonyl agent;
(ii) a thiol agent; and
(iii) a curing catalyst.

In some aspects, the present disclosure provides a building material for printing an object (e.g., 3D printing), wherein the building material comprises:
(i) a vinyl sulfonyl agent; and
(ii) a thiol agent.

In some aspects, the present disclosure provides a building material for printing an object (e.g., 3D printing), wherein the building material comprises:
(i) a vinyl sulfonyl agent;
(ii) a thiol agent; and
(iii) a curing catalyst.

In some aspects, the present disclosure provides a kit for printing an object (e.g., 3D printing), wherein the kit comprises:
a build material comprising:
(i) a vinyl sulfonyl agent; and
(ii) a thiol agent; and
a support material.

In some aspects, the present disclosure provides a kit for printing an object (e.g., 3D printing), wherein the kit comprises:
a build material comprising:
(i) a vinyl sulfonyl agent;
(ii) a thiol agent; and
(iii) a curing catalyst; and
a support material.

In some embodiments, the printing further comprises repeating the step of depositing the combination or build material for one or more time.

In some embodiments, the printing further comprises optically sensing the deposited combination or build material, and controlling the one or more repeated deposition of the combination or build material according to the sensing.

In some embodiments, the optionally sensing of the deposited combination or build material is performed when the material is at least partially cured.

In some embodiments, each repeated deposition of the combination or build material is performed when the previously deposited layer of the combination or build material is at least partially cured.

In some embodiments, the printing further comprises depositing an agent which enhances one or more of the mechanical, thermal, and/or optical properties of the combination or build material.

In some embodiments, sensing the deposited material comprises capturing a surface of the object being printed.

In some embodiments, sensing the deposited combination or build material comprises capturing volumetric and/or tomographic data of the object being printed.

In some embodiments, the controlling one or more repeated deposition of the combination or build material comprises using an active feedback loop to modify the one or more repeated deposition of the combination or build material according to the data produced by the sensing.

In some embodiments, the controlling one or more repeated deposition of the combination or build material is based on measurements of a surface of the object being printed.

In some embodiments, the controlling one or more repeated deposition of the combination or build material is based on measurements of the volumetric/tomographic data of an object being printed.

In some embodiments, the printing further comprises heating the combination or build material, thereby facilitating the curing of the combination or build material.

Combinations, Build Materials, and Kits

In some embodiments, the combination, build material, or kit further comprises a sensitizer.

In some embodiments, the combination, build material, or kit further comprises a toughening agent.

In some embodiments, the combination, build material, or kit further comprises a stabilizer.

In some embodiments, the combination, material, or kit further comprises a surface tension modifier.

In some embodiments, the combination, material, or kit further comprises a colorant.

Vinyl Sulfonyl Agents

It is understood that the term "vinyl sulfonyl agent", as used herein, refers to an agent comprising a vinyl sulfonyl moiety (e.g.,

).

In some embodiments, the vinyl sulfonyl agent comprises two or more vinyl sulfonyl moieties (e.g.,

).

In some embodiments, the vinyl sulfonyl agent is a monomer (e.g., for thiol-ene polymerization).

In some embodiments, the vinyl sulfonyl agent is an oligomer (e.g., for thiol-ene polymerization).

In some embodiments, the vinyl sulfonyl agent is a polymer.

In some embodiments, each vinyl sulfonyl moiety independently is wherein each R independently is H or a substitution.

In some embodiments, at least one vinyl sulfonyl moiety is

In some embodiments, at least one vinyl sulfonyl moiety is

In some embodiments, at least one vinyl sulfonyl moiety is and at least one vinyl sulfonyl moiety is

In some embodiments, at least one vinyl sulfonyl moiety is

In some embodiments, each vinyl sulfonyl moiety is

In some embodiments, each vinyl sulfonyl moiety is

In some embodiments, each vinyl sulfonyl moiety is

Thiol Agents

It is understood that the term "thiol agent", as used herein, refers to an agent comprising a thiol moiety (e.g.,

).

In some embodiments, the thiol agent comprises two or more thiol moieties (e.g.,

).

In some embodiments, the thiol agent is a monomer (e.g., for thiol-ene polymerization).

In some embodiments, the thiol agent is an oligomer (e.g., for thiol-ene polymerization).

In some embodiments, the thiol agent is a polymer.

Curing Catalysts

In some embodiments, the curing catalyst is a latent catalyst.

In some embodiments, the latent catalyst is a photo-latent catalyst, a thermal-latent catalyst, or a chemically latent catalyst.

In some embodiments, the curing catalyst is a non-latent catalyst.

In some embodiments, the curing catalyst (e.g., the latent catalyst) is activated by irradiation.

In some embodiments, the curing catalyst (e.g., the latent catalyst) is activated by actinic radiation.

In some embodiments, the curing catalyst (e.g., the latent catalyst) is activated by actinic radiation in the presence of a sensitizer.

In some embodiments, the curing catalyst (e.g., the latent catalyst) is activated by UV or visible light.

In some embodiments, the curing catalyst (e.g., the latent catalyst) is activated by UV or visible light in the presence of a sensitizer.

In some embodiments, the curing catalyst comprises a photoinitiator.

In some embodiments, upon activation, the curing catalyst (e.g., photoinitiator) generates a radical.

In some embodiments, upon activation, the curing catalyst (e.g., photoinitiator) generates a base (e.g., a carbene base).

In some embodiments, upon activation, the curing catalyst (e.g. photoinitiator) generates a nucleophile (e.g., a phosphine nucleophile)

In some embodiments, the curing catalyst comprises a base catalyst.

In some embodiments, the base catalyst is a base or a precursor of a base.

In some embodiments, the base catalyst is a base, e.g., an organic base or an inorganic base.

In some embodiments, the base catalyst is an amine.

In some embodiments, the base catalyst is a precursor of a base.

In some embodiments, upon activation, the curing catalyst is converted to, or releases, a base. Without wishing to be bound by theory, it is understood that the base catalyst (e.g., upon activation) could serve as a base (e.g., for deprotonating the thiol agent) and/or as a nucleophile (e.g., for activating the vinyl sulfonyl agent).

Colorants

In some embodiments, the combination, material, or kit further comprises a colorant.

In some embodiments, the colorant comprises a pigment, a dye, or a combination thereof.

In some embodiments, the colorant comprises a pigment.

In some embodiments, the pigment is an organic pigment, an inorganic pigment, or a combination thereof.

In some embodiments, the colorant comprises a dye.

In some embodiments, the dye is an organic dye, an inorganic dye, or a combination thereof.

Without wishing to be bound by theory, it is noted that the pigment or dye may enable the optical sensing (e.g., scanning) of the deposited material during printing. In some embodiments, the combination or build material containing the pigment or dye is colored, thereby enabling the optical sensing (e.g., scanning) of the deposited material by its color. In some embodiments, the combination or build material containing the pigment or dye is colorless but fluorescent, thereby enabling the optical sensing (e.g., scanning) of the deposited material by its fluorescence.

Properties of the Build Materials

In some embodiments, the build material has a viscosity of about 150 cp or lower, about 140 cp or lower, about 130 cp or lower, about 120 cp or lower, about 110 cp or lower, about 100 cp or lower, about 90 cp or lower, about 80 cp or lower, about 70 cp or lower, about 60 cp or lower, or about 50 cp or lower, as measured at a temperature of about 100° C.

In some embodiments, the build material has a viscosity of about 120 cp or lower, about 110 cp or lower, about 100 cp or lower, about 90 cp or lower, about 80 cp or lower, about 70 cp or lower, about 60 cp or lower, or about 50 cp or lower, as measured at a temperature of about 80° C.

In some embodiments, the build material has a surface tension of about 33±20 mN/m, about 33±15 mN/m, about 33±10 mN/m, about 33±9 mN/m, about 33±mN/m, about 33±7 mN/m, about 33±6 mN/m, about 33±5 mN/m, about 33±4 mN/m, about 33±3 mN/m, about 33±2 mN/m, or about 33±1 mN/m (e.g., about 33 mN/m) as measured at a temperature of about 100° C.

In some embodiments, the build material has a surface tension of about 33±20 mN/m, about 33±15 mN/m, about 33±10 mN/m, about 33±9 mN/m, about 33±mN/m, about 33±7 mN/m, about 33±6 mN/m, about 33±5 mN/m, about 33±4 mN/m, about 33±3 mN/m, about 33±2 mN/m, or about 33±1 mN/m (e.g., about 33 mN/m) as measured at a temperature of about 80° C.

Depositing and Curing of Build Materials

In some embodiments, the build material is deposited (e.g., jetted) under a build depositing condition (e.g., build jetting condition).

In some embodiments, the build material is cured under a build curing condition.

In some embodiments, the build material is a liquid under the build depositing condition (e.g., the build jetting condition).

In some embodiments, the build material is a wax.

In some embodiments, the build material has a melting point being the same or lower than the temperature of the build depositing condition.

In some embodiments, upon deposition, the build material is converted to a solid (e.g., via a phase change).

In some embodiments, upon deposition, the build material is converted to a solid by curing.

In some embodiments, the build material is substantially stable (e.g., chemically and/or physically) toward the support material.

In some embodiments, the build material is substantially stable (e.g., chemically and/or physically) under the support curing condition.

In some embodiments, the build material is substantially stable (e.g., chemically and/or physically) toward the cured support material.

In some embodiments, upon activation, the curing catalyst cures the build material but does not cure the support material.

In some embodiments, the build curing condition comprises radiation.

In some embodiments, the build curing condition comprises actinic radiation.

In some embodiments, the radiation is UV or visible light.

In some embodiments, the curing condition further comprises an elevated temperature.

In some embodiments, the build curing condition is substantially free of air (e.g., oxygen).

In some embodiments, the build curing condition is substantially free of water.

In some embodiments, the cured build material is substantially stable (e.g., chemically and/or physically) toward the cured support material In some embodiments, the cured build material is substantially stable (e.g., chemically and/or physically) under the support removal condition.

In some embodiments, the cured build material comprises a thiol-ene polymer.

Cured Build Materials

In some aspects, the present disclosure provides a cured build material described herein.

In some aspects, the present disclosure provides a cured build material being prepared by a method described herein.

In some embodiments, the cured build material has a glass transition temperature (Tg) from about 40° C. to about 200° C.

In some embodiments, the cured build material has a glass transition temperature (Tg) of about 95±50° C., about 95±40° C., about 95±30° C., about 95±20° C., about 95±15° C., about 95±10° C., or about 95±5° C.

In some embodiments, the cured build material has a tensile strength from about 0.5 MPa to about 70 MPa.

In some embodiments, the cured build material has an elongation at break from about 5% to about 1000%.

In some embodiments, the cured build material has Shore hardness from about 20 A to about 80 D.

Depositing and Curing of Support Materials

In some embodiments, the support material is deposited (e.g., jetted) under a support depositing condition (e.g., support jetting condition).

In some embodiments, the support material is cured under a support curing condition.

In some embodiments, the support material or the cured support material is removed under a support removal condition.

In some embodiments, the support material is a liquid under the support depositing condition (e.g., the support jetting condition).

In some embodiments, the support material is a wax.

In some embodiments, the support material has a melting point being the same or lower than the temperature of the support depositing condition.

In some embodiments, upon deposition, the support material is converted to a solid (e.g., via a phase change).

In some embodiments, upon deposition, the support material is converted to a solid by cooling.

In some embodiments, upon deposition, the support material is converted to a solid by curing.

In some embodiments, the support material is UV curable.

In some embodiments, the support material is thermally curable.

In some embodiments, the support curing condition comprises irradiation (e.g., visible light or UV).

In some embodiments, the support curing condition comprises elevated temperature.

In some embodiments, the support curing condition is substantially free of air (e.g., oxygen).

In some embodiments, the support curing condition is substantially free of water.

In some embodiments, the cured support material is substantially stable (e.g., chemically and/or physically) toward the build material.

In some embodiments, the cured support material is substantially stable (e.g., chemically and/or physically) under the build curing condition.

In some embodiments, the cured support material comprises a polymer.

In some embodiments, the support removal condition comprises adding a solvent, thereby dissolving the cured support material.

In some embodiments, the support removal condition comprises mechanically removing the cured support material.

In some embodiments, the support removal condition comprises converting the support material from a solid to a liquid (e.g., via a phase change).

Systems for Printing

In some aspects, the present disclosure provides a system for printing an object (e.g., 3D printing), comprising:
(i) a printer (e.g., an inkjet printer); and
(ii) a combination, build material, or kit disclosed herein.

Suitable applications and systems for the materials of the present disclosure are described, e.g., in U.S. Provisional Appl'n No. 62/777,422 and PCT Appl'n No. PCT/US2019/065436 (incorporated herein by reference).

In some embodiments, the printer (e.g., the inkjet printer) comprises one or more printer jet; an optical feedback scanner; and a controller which controls the emission of the ink from the one or more printer jet according to the optical feedback of the jetted ink.

In some embodiments, the printer (e.g., the inkjet printer) further comprises a printing head loaded (e.g., a printing head loaded with the ink).

In some embodiments, the system further comprises a light source (e.g., a UV lamp or a visible-light lamp) configured to cure the deposited layers of the ink.

In some embodiments, the system further comprises a software comprising instructions stored on a non-transitory machine-readable medium, wherein execution of said instructions causes control of one or more of the printing steps described herein.

The description below relates an exemplary system for additive fabrication, e.g., using a jetting-based 3D printer 100 shown in FIG. 1. The printer 100 uses jets 120 (inkjets) to emit material for deposition on a partially fabricated objected layers. In the printer illustrated in FIG. 1, the object is fabricated on a build platform, which is controlled to move related to the jets is a raster-like pattern to form successive layers, and in this example also to move relative to the jets to maintain a desired separation of the jets and the surface of the partially-fabricated object. As illustrated, there are multiple jets 122, 124, with one jet 122 being used to emit a support material to form a support structure 142 of the object, and another jet 124 being used to emit built material to form the object 144 itself. For materials for which curing is triggered by an excitation signal, such as an ultraviolet illumination, a curing signal generator 170 (e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A sensor 160 is used to determine physical characteristics of the partially fabricated object, including one or more of the surface geometry (e.g., a depth map characterizing the thickness/depth of the partially fabricated object), subsurface (e.g., in the near surface comprising, for example, 10 s or 100 s of deposited layers) characteristics. The characteristic that may be sensed can include one or more of a material density, material identification, and a curing state. Various types of sensing can be used, including optical coherence tomography (OCT), laser profilometry, and/or as well as multi-spectral optical sensing, which may be used to distinguish different materials. In the illustrated printer, the sensor outputs a signal that may cause emission (e.g., fluorescence) and/or reflection, scattering, or absorption from or in the object. The sensor output signal may be provided from the top (i.e., the most recently deposited portion) of the object, while in some embodiments, the sensor output signal may come from below or other direction of the object.

Precision additive fabrication using inkjet technology has introduced use of optical-scanning-based feedback in order to adapt the deposition of material to achieve accurate object structure without requiring mechanical approaches that have been previously used. For example, such optical feedback techniques are described in U.S. Pat. Nos. 10,252,466 and 10,456,984 (incorporated by reference). However, optical feedback-based printers are not a prevalent commercial approach to 3D printing, perhaps due to the relative simplicity of approaches that do not achieve the precision attainable with optical feedback or that use mechanical approaches in conjunction with rapidly curing inks. Furthermore, many fabrication materials suitable for jetted additive fabrication are not directly suitable for optical scanning as inadequate optical signal strength may propagate from the material during scanning. For example, the material may be naturally substantially transparent and not reflect incident light suitably to be captured to yield an accurate characterization of the object being fabricated. However, with suitable incorporation of an optical enhancement component in the fabrication material, the ability to scan the material that has been deposited can be enhanced. Further details regarding suitable optical enhancement components may be found in PCT Appl'n No. PCT/US2019/59300 (incorporated herein by reference).

By not requiring contact to control the surface geometry of the object being manufactured, the approach is tolerant of the relative slow curing of the composition (e.g., as compared to acrylate compositions usually used in inkjet 3D printing), while maintaining the benefit of control of the deposition processes according to feedback during the fabrication processes. This approach provides a way to manufacture precision objects and benefit from material properties of the fabricated objects, for example, with isotropic properties, which may be at least partially a result of the slow curing, and flexible structures, which may not be attainable using conventional jetted acrylates. Furthermore, in cases when ongoing curing after scanning may change the geometry of the part, for example, due to shrinkage, predictive techniques (e.g., using machine-learning approaches, e.g., as described in PCT Appl'n No. PCT/US2019/59567 (incorporated herein by reference)) may be used in the control process to predict such changes, further accommodating the cationic compositions into a precision jetted fabrication approach.

A controller 110 uses a model 190 of the object to be fabricated to control motion of the build platform 130 using a motion actuator 150 (e.g., providing three degree of motion) and control the emission of material from the jets 120 according to the non-contact feedback of the object characteristics determined via the sensor 160. Use of the feedback arrangement can produce a precision object by compensating for inherent unpredictable aspects of jetting (e.g., clogging of jet orifices) and unpredictable material changes after deposition, including for example, flowing, mixing, absorption, and curing of the jetted materials.

Figure 1:
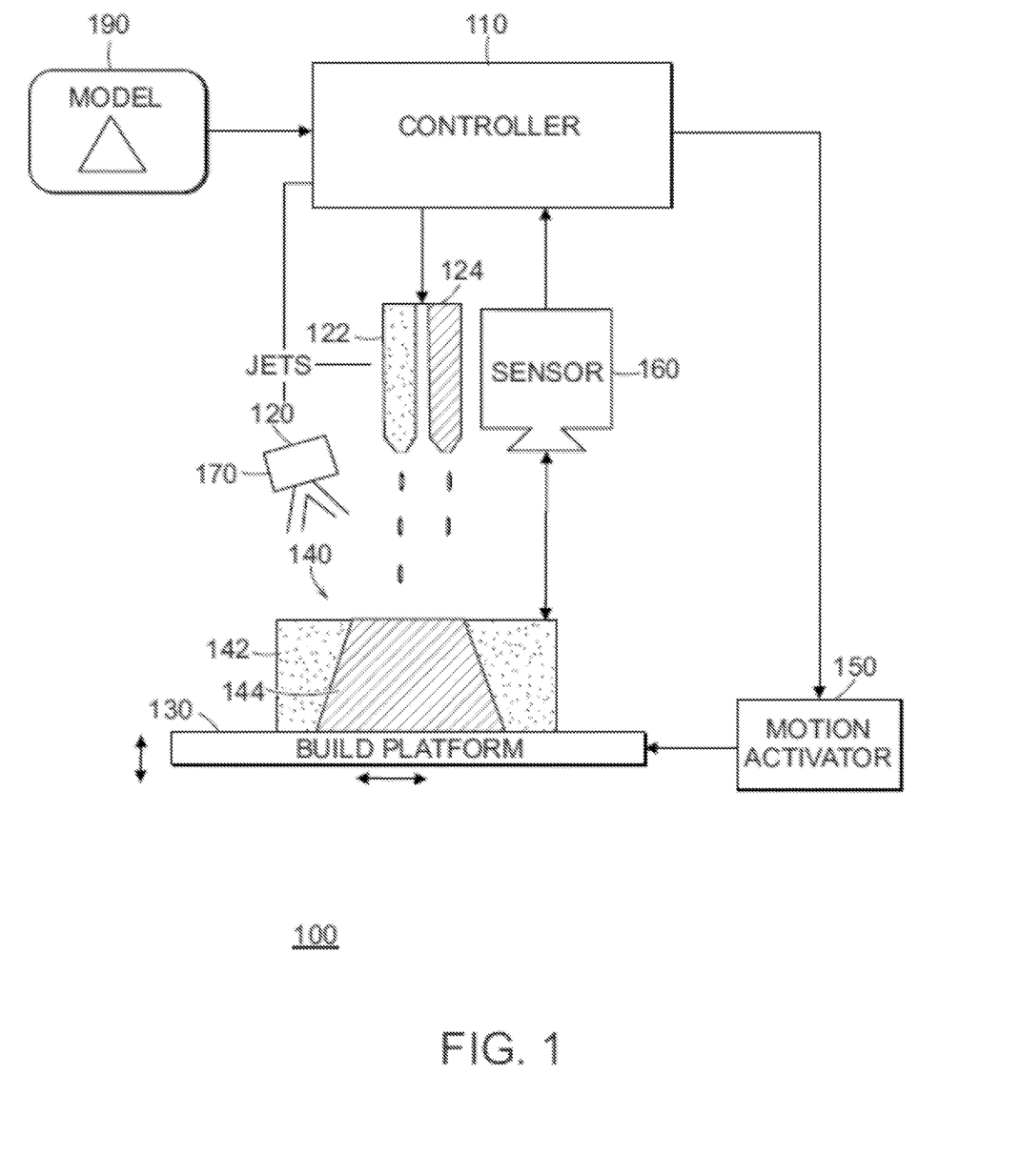
FIG. 1 is a schematic diagram of an exemplary 3D printer.

It is understood that the printer shown in FIG. 1 is merely illustrative but not limiting. Other printer arrangements that may be used are described, e.g., in U.S. Pat. Nos. 10,252,466 and 10,456,984, U.S. Appl'n Pub. No. 2018/0056582, and Sitthi-Amorn et al. (ACM Transactions on Graphics 34(4): 129 (2015)).

In an alternative manufacturing process, an additive fabrication stage and a subsequent or overlapping part curing stage imparts two distinct mechanisms to the build material for the part of the object: a phase change mechanism and a polymerization mechanism.

The phase change mechanism occurs during the additive fabrication stage and causes a phase change of the build material from a liquid to a non-liquid (e.g., at least partially solid, semi-solid, and/or quasi-solid), where the phase change is generally not due to polymerization. In this non-liquid form the build material is sufficiently solidified for subsequent incremental deposit of material on to it (e.g., the non-liquid build material can support the weight of incrementally added material and/or the force of the material as it is jetted to, for example, prevent mixing between the build material and the support material).

The polymerization mechanism occurs after, or at least partly after, the additive fabrication of the object during the curing stage. This mechanism cures the build material by a polymerization process. In some examples, the polymerization mechanism is initiated after additive fabrication of the object is complete. In other examples, the polymerization mechanism is initiated before additive manufacturing is complete, for example, being initiated during the phase change mechanism (e.g., with both mechanisms being initiated at the same time, or the polymerization mechanism being initiated during the phase change mechanism).

After the build material is sufficiently cured (e.g., sufficiently polymerized) in the curing stage to allow removal of the mold, the manufacturing process enters a part removal stage for removal of the mold. Removal of the mold yields the fabricated part.

Figure 2:
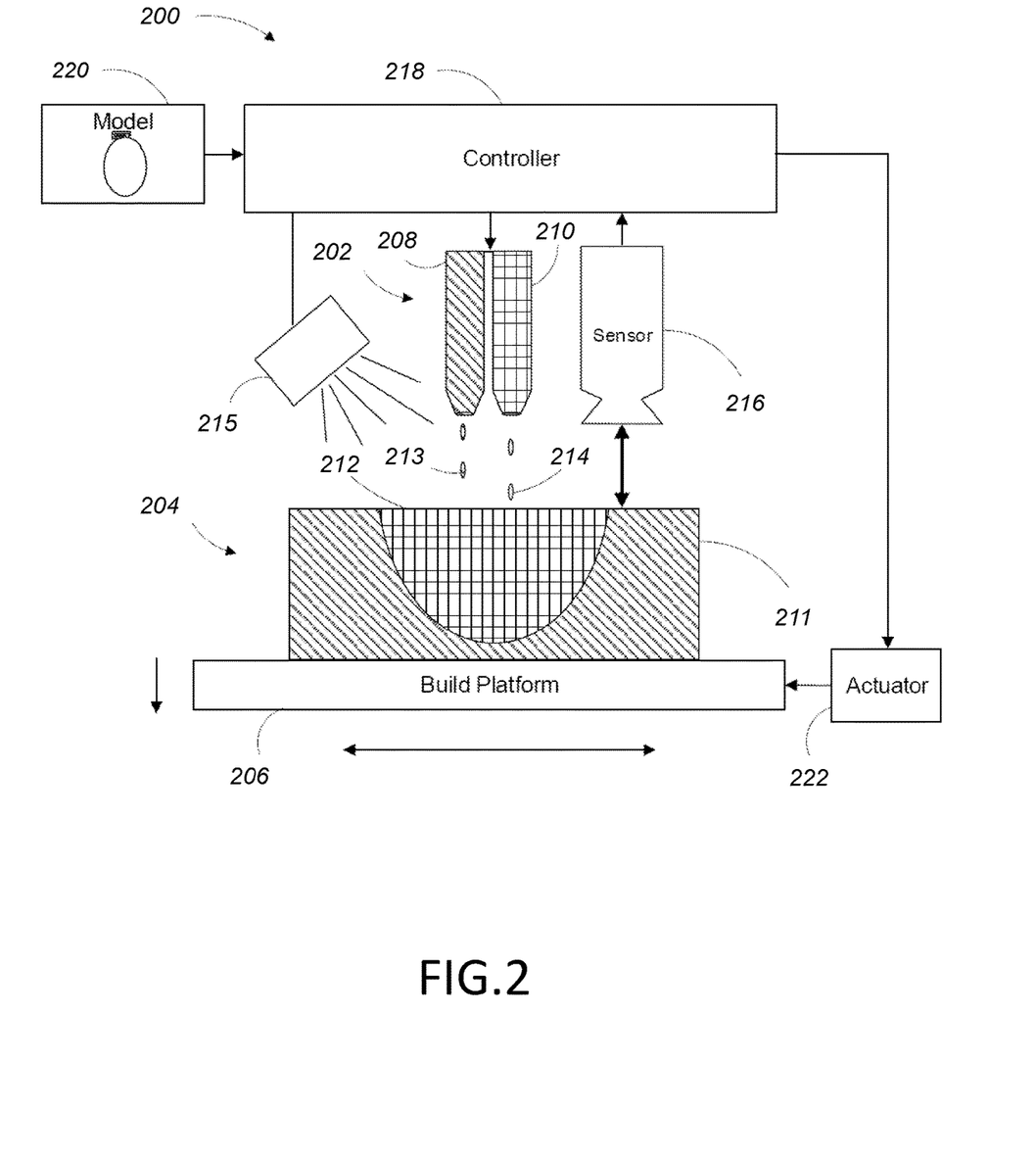
FIG. 2 is a schematic diagram of an alternative exemplary 3D printer.

Referring to FIG. 2, this alternative manufacturing process uses a jetting-based 3D printer 200 as shown in FIG. 2. Very generally, the manufacturing process includes three temporal phases: an additive fabrication stage, a part curing stage, and a part removal stage. As is described in greater detail below, in some examples, the part curing stage occurs entirely after the additive fabrication stage. In other examples the additive fabrication stage and the part curing stage partially overlap.

In the additive fabrication stage, additive fabrication is used to fabricate an object 204 including a solid (e.g., cured) mold structure 211 that forms a cavity (e.g., closed structure or open vessel) defining a shape of the part 212, where the cavity is filled with a semi-solid, uncured or partially cured material in the shape of the part 212. The solid mold structure 211 and/or the semi-solid material are added, layer by layer, to form the object 204.

In the part curing stage, at least some of which occurs at a time after completion of the additive fabrication stage, the object 204 including the filled mold structure 211 undergoes a curing process for polymerizing the material in the cavity.

In the additive manufacturing stage and the part curing stage, the material used to form the part 212 (sometimes referred to as "build material) undergoes two distinct mechanisms: a phase change mechanism and a polymerization mechanism.

The phase change mechanism occurs during the additive fabrication stage and causes a phase change of the build material from a liquid to a non-liquid (e.g., at least partially solid, semi-solid, and/or quasi-solid, where these three terms may be used interchangeably herein). In this non-liquid form the build material is sufficiently solidified for subsequent incremental deposit of material on to it (e.g., the non-liquid build material can support the weight or force of incrementally added material).

The polymerization mechanism occurs after, or at least partly after, the additive fabrication of the object 204 during the curing stage. This mechanism cures the build material by a polymerization process. In some examples, the polymerization mechanism is initiated after additive fabrication of the object is complete. In other examples, the polymerization mechanism is initiated before additive manufacturing is complete, for example, being initiated during the phase change mechanism (e.g., with both mechanisms being initiated at the same time, or the polymerization mechanism being initiated after initiation and during the phase change mechanism).

In the part removal stage, the solid mold structure 211 is removed, yielding the part 212. In some examples, the part removal stage occurs after the part curing stage. But in other examples, the part removal stage may overlap with the part curing stage (e.g., the part 212 is still curing but is sufficiently cured for removal from the solid mold structure 211).

Printer

In the additive fabrication stage, the printer 200 uses jets 202 (inkjets) to emit material for deposition of layers to form the object 204 (shown partially fabricated in FIG. 2). For the printer illustrated in FIG. 2, the object 204 is fabricated on a build platform 206, which is controlled to move relative to the jets (i.e., along an x-y plane) in a raster-like pattern to form successive layers, and in this example also to move relative to the jets (i.e., along a z-axis) to maintain a desired separation of the jets and the surface of the partially-fabricated object 204.

As illustrated, there are multiple jets 208, 210, for example with a first jet 208 being used to emit a mold material 213 to form a solid (e.g., cured or semi-cured) mold structure 211 of the object 204, and a second jet 210 being used to emit build material 214 to form an uncured or partially cured, semi-solid (e.g., a gel or a wax) part 212 in the object 204. Additional details of the properties of the mold material 213 and the build material 214 are described below.

A sensor 216 (sometimes referred to as a scanner) is positioned relative to (e.g., above) the object under fabrication 204 and is used to determine physical characteristics of the partially fabricated object. For example, the sensor 216 measures one or more of the surface geometry (e.g., a depth map characterizing the thickness/depth of the partially fabricated object) and subsurface characteristics (e.g., in the near surface comprising, for example, 10 s or 100 s of deposited layers). The characteristics that may be sensed can include one or more of a material density, material identification, and a curing state. Very generally, the measurements from the sensor 216 are associated with a three-dimensional (i.e., x, y, z) coordinate system where the x and y axes are treated as spatial axes in the plane of the build surface and the z axis is a height axis (i.e., growing as the object is fabricated).

In some examples, in the context of a digital feedback loop for additive fabrication, the additive manufacturing system builds the object by printing layers. The sensor 216 captures the 3D scan information after the printer 200 prints one or more layers. For example, the sensor 216 scans the partial object (or empty build platform), then the printer prints a layer (or layers) of material(s). Then, the sensor 216 scans the (partially built) object again. The new depth sensed by the sensor 216 should be at a distance that is approximately the old depth minus the thickness of layer (this assumes that the sensor 216 is positioned on the top of the of the object being built and the object is being built from the bottom layer to the top layer and the distance between the sensor 216 and the build platform is unchanged). Various types of sensing such as optical coherence tomography (OCT) or laser profilometry can be used to determine depth and volumetric information related to the object being fabricated.

A controller 218 uses a model 220 of the object to be fabricated to control motion of the build platform 206 using a motion actuator 222 (e.g., providing three degrees of motion) and control the emission of material from the jets 202 according to non-contact feedback of the object characteristics determined via the sensor 216.

Definitions

It is understood that when the combination, material, or kit is described as "comprising an X" or "comprising at least one X", such phrase intends to refer to that the combination, material, or kit contains at least one X, but the phrase does not intend to limit the combination, material, or kit to comprise only one X. That is, in the present disclosure, the terms "comprising an X" and "comprising at least one X" are exchangeable.

As used herein, the term "actinic radiation" refers to an electromagnetic radiation that can produce photochemical reactions. In some embodiments, the actinic radiation is UV or visible light.

As used herein, the term "photoinitiator" refers to an agent that generates reactive species (e.g., radicals, cations, anions) when exposed to radiation (e.g., UV or visible light), or when exposed to an activated sensitizer.

As used herein, the term "sensitizer" refers to an agent (e.g., a compound) that produces a chemical change (e.g., a radial, cation, or anion) in another agent (e.g., a photoinitiator) in a photochemical process.

As used herein, the term "toughening agent" refers an agent that enhances the ability of a material (e.g., a polymeric material) to absorb energy and plastically deform without fracture. In some embodiments, upon subjecting to a condition (e.g., a curing condition), the toughening agent enhances the ability of a material (e.g., a cured material) to absorb energy and plastically deform without fracture.

As used herein, the term "pigment" refers to a colored, black, white, or fluorescent particulate organic or inorganic solid. In some embodiments, the pigment insoluble in, and essentially physically and chemically unaffected by, the vehicle or substrate in which it is incorporated. In some embodiments, the pigment alters appearance by selective absorption and/or by scattering of light. In some embodiments, the pigment is dispersed in vehicles or substrates for application, as for instance in the manufacture or inks or other polymeric materials. In some embodiments, the pigment retains a crystal or particulate structure throughout the coloration process.

As used herein, the term "dye" refers to an intensely colored or fluorescent organic substances which imparts color to a substrate by selective absorption of light. In some embodiments, the dye is soluble and/or goes through an application process which, at least temporarily, destroys any crystal structure by absorption, solution, and mechanical retention, or by ionic or covalent chemical bonds.

As used herein, the term "viscosity" refers to the ability of a composition (e.g., the material of the present disclosure) to resist deformation at a given rate.

As used herein, the term "surface tension" refers to the tendency of the surface of a composition (e.g., the material of the present disclosure) to shrink into the minimum surface area possible. In some embodiments, the surface tension is measured in the dimension of force per unit length, or of energy per unit area.

As used herein, the term "curing" refers to a process of converting a material by forming polymers and/or linking existing polymers in the material, thereby producing a cured material. In some embodiments, the conversion is initiated by radiation (e.g., UV or visible light).

As used herein, the term "notched Izod impact strength" refers to a mechanical property that measures the impact resistance of a solid material. In some embodiments, it is measured by a method in which a pivoting arm is raised to a specific height (constant potential energy) and then released. The arm swings down hitting a notched sample, breaking the specimen. The energy absorbed by the sample is calculated from the height the arm swings to after hitting the sample. A notched sample is generally used to determine impact energy and notch sensitivity. Notched Izod impact strength is associated with the energy lost per unit cross-sectional area (e.g., $kJ/m^2$) at the notch. In some embodiments, the notched Izod impact strength is measured by the ASTM D256.

As used herein, the term "glass transition temperature" or "Tg" refers to the temperature over which the referred material undergoes a glass transition, i.e., a transition in amorphous material (or in an amorphous region within semicrystalline material) from a hard and relatively brittle "glassy" state into a viscous or rubbery state. In some embodiments, the glass transition temperature is measured by a differential scanning calorimetry (DSC).

As used herein, the term "tensile strength" refers to the maximum stress that a material can withstand while being stretched or pulled before breaking. In some embodiments, the tensile strength is measured by the ASTM D412, ASTM D624, or ASTM D638.

As used herein, the term "elongation at break" refers to the ratio between increased length and initial length after breakage of the tested specimen at a controlled temperature. In some embodiments, the elongation at break is measured by the ASTM D412, ASTM D624, or ASTM D638.

As used herein, the term "Young's modulus" refers to a mechanical property that measures the stiffness of a solid material. Young's modulus is associated with the relationship between stress (force per unit area) and strain (proportional deformation) in a material in the linear elasticity regime of a uniaxial deformation. In some embodiments, the Young's modulus is measured by the ASTM D412, ASTM D624, or ASTM D638.

As used herein, the term "Shore hardness" refers to the hardness of a material as being measured by a Shore durometer. In some embodiments, the Shore hardness is measured by a Shore durometer of type A, B, C, D, DO, E, M, O, OO, OOO, OOO-S, or R.

As used herein, the term "about" refers to a range covering any normal fluctuations appreciated by one of ordinary skill in the relevant art. In some embodiments, the term "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

As used herein, the term "derivative" refers to compounds that have a common core structure as compared to the referenced compound and/or share one or more property with the referenced compound. In some embodiments, the derivatives are substituted with various groups as described herein as compared to the referenced compound.

As used herein, the term "substitution" refers to that any one or more hydrogen atoms on the designated atom is replaced with a selection from the indicated groups, provided that the designated atom's normal valency is not exceeded, and that the substitution results in a stable compound. When a substituent is oxo or keto (i.e., =O), then 2 hydrogen atoms on the atom are replaced. Keto substituents are not present on aromatic moieties. Ring double bonds, as used herein, are double bonds that are formed between two adjacent ring atoms (e.g., C=C, C=N or N=N). "Stable compound" and "stable structure" are meant to indicate a compound that is sufficiently robust to survive isolation to a useful degree of purity from a reaction mixture, and material into an efficacious therapeutic agent. Such substituents can include, for example, alkyl, alkenyl, alkynyl, halogen, hydroxyl, alkylcarbonyloxy, arylcarbonyloxy, alkoxycarbonyloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, amino (including alkylamino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfates, alkylsulfinyl, sulfonato, sulfamoyl, sulfonamido, nitro, trifluoromethyl, cyano, azido, heterocyclyl, alkylaryl, or an aromatic or heteroaromatic moiety.

As used herein, the expressions "one or more of A, B, or C," "one or more A, B, or C," "one or more of A, B, and C," "one or more A, B, and C," "selected from the group consisting of A, B, and C", "selected from A, B, and C", and the like are used interchangeably and all refer to a selection from a group consisting of A, B, and/or C, i.e., one or more As, one or more Bs, one or more Cs, or any combination thereof, unless indicated otherwise.

All percentages and ratios used herein, unless otherwise indicated, are by weight. Other features and advantages of the present disclosure are apparent from the different examples. The provided examples illustrate different components and methodology useful in practicing the present disclosure. The examples do not limit the claimed disclosure. Based on the present disclosure the skilled artisan can identify and employ other components and methodology useful for practicing the present disclosure.

All publications and patent documents cited herein are incorporated herein by reference as if each such publication or document was specifically and individually indicated to be incorporated herein by reference. Citation of publications and patent documents is not intended as an admission that any is pertinent prior art, nor does it constitute any admission as to the contents or date of the same. The invention having now been described by way of written description, those of skill in the art will recognize that the invention can be practiced in a variety of embodiments and that the foregoing description and examples below are for purposes of illustration but not limitation.

EXAMPLES

Example 1. Preparation of Exemplary Materials

Exemplary materials are prepared using DMPDVSA and SiTSH shown below.

Properties of the material are shown in Table A. The viscosity with variable microfiller is measured at a shear rate of 200 s−1.

TABLE A

| Filler Loading (%) | Viscosity (Pa-s) |
|---|---|
| 0 | 0.2 ± 0.1 |
| 20 | 0.2 ± 0.1 |
| 40 | 0.5 ± 0.1 |
| 60 | 66 ± 2 |

EQUIVALENTS

The details of one or more embodiments of the disclosure are set forth in the accompanying description above. Although any methods and materials similar or equivalent to those described herein can be used in the practice or testing of the present disclosure, the preferred methods and materials are now described. Other features, objects, and advantages of the disclosure will be apparent from the description and from the claims. In the specification and the appended claims, the singular forms include plural referents unless the context clearly dictates otherwise. Unless defined otherwise, all technical and scientific terms used herein have the same meaning as commonly understood by one of ordinary skill in the art to which this disclosure belongs. All patents and publications cited in this specification are incorporated by reference.

The foregoing description has been presented only for the purposes of illustration and is not intended to limit the disclosure to the precise form disclosed.

The invention claimed is:

1. A method for printing an object, comprising:
   (a) depositing a combination comprising (i) a vinyl sulfonyl agent and (ii) a thiol agent; and
   (b) subjecting the deposited combination to a curing condition;
   wherein the vinyl sulfonyl agent comprises 2. The method of claim 1, wherein the combination further comprises (iii) a curing catalyst.

3. The method of claim 1, wherein step (a) comprises depositing a building material comprising (i) a vinyl sulfonyl agent and (ii) a thiol agent.

4. The method of claim 3, wherein the building material further comprises (iii) a curing catalyst.

5. The method of claim 1, further comprising repeating the step of depositing the combination for one or more time.

6. The method of claim 5, further comprising:
optically sensing the deposited combination, and
controlling the one or more repeated deposition of the combination according to the sensing.

7. The method of claim 6, wherein sensing the deposited combination comprises capturing volumetric and/or tomographic data of the object being printed.

8. The method of claim 6, wherein the controlling one or more repeated deposition of the combination comprises using an active feedback loop to modify the one or more repeated deposition of the combination according to the data produced by the sensing.

9. The method of claim 1, wherein the combination comprises a sensitizer.

10. The method of claim 1, wherein the combination further comprises a toughening agent.

11. The method of claim 1, wherein the combination further comprises a stabilizer.

12. The method of claim 1, wherein the combination further comprises a surface tension modifier.

13. The method of claim 1, wherein the combination further comprises a colorant.

14. The method of claim 1, wherein the vinyl sulfonyl agent comprises two or more vinyl sulfonyl moieties.

15. The method of claim 14, wherein each vinyl sulfonyl moiety independently is wherein each R independently is H or a substitution.

16. The method of claim 14, wherein each vinyl sulfonyl moiety is

17. The method of claim 14, wherein each vinyl sulfonyl moiety is

18. The method of claim 14, wherein each vinyl sulfonyl moiety is

19. The method of claim 1, wherein the thiol agent comprises two or more thiol moieties.

20. The method of claim 2, wherein the curing catalyst is a latent catalyst.

21. The method of claim 20, wherein the latent catalyst is a photo-latent catalyst, a thermal-latent catalyst, or a chemically latent catalyst.

22. The method of claim 2, wherein the curing catalyst is a non-latent catalyst.

23. The method of claim 2, wherein the curing catalyst is activated by actinic radiation.

24. The method of claim 2, wherein the curing catalyst is activated by actinic radiation in the presence of a sensitizer.

25. The method of claim 2, wherein the curing catalyst comprises a photoinitiator.

26. The method of claim 2, wherein the curing catalyst comprises a base catalyst.

27. The method of claim 26, wherein the base catalyst is a base.

28. The method of claim 26, wherein the base catalyst is a precursor of a base.

* * * * *